(12) United States Patent
Chu et al.

(10) Patent No.: US 9,792,898 B2
(45) Date of Patent: Oct. 17, 2017

(54) CONCURRENT SEGMENTATION OF MULTIPLE SIMILAR VOCALIZATIONS

(71) Applicant: Malaspina Labs (Barbados), Inc., Vancouver (CA)

(72) Inventors: Clarence Chu, Vancouver (CA); Alireza Kenarsari Anhari, Vancouver (CA)

(73) Assignee: MALASPINA LABS (BARBADOS), INC., St. Michael (BB)

( * ) Notice: Subject to any disclaimer, the term of this patent is extended or adjusted under 35 U.S.C. 154(b) by 201 days.

(21) Appl. No.: 14/806,732

(22) Filed: Jul. 23, 2015

(65) Prior Publication Data

US 2016/0027438 A1 Jan. 28, 2016

Related U.S. Application Data

(60) Provisional application No. 62/029,560, filed on Jul. 27, 2014.

(51) Int. Cl.
*G10L 15/20* (2006.01)
*G10L 15/06* (2013.01)
*G10L 15/02* (2006.01)
*G10L 15/04* (2013.01)
*G10L 15/12* (2006.01)
*G10L 15/08* (2006.01)

(52) U.S. Cl.
CPC ............ *G10L 15/06* (2013.01); *G10L 15/02* (2013.01); *G10L 15/04* (2013.01); *G10L 15/12* (2013.01); *G10L 15/20* (2013.01); *G10L 2015/081* (2013.01); *G10L 2015/088* (2013.01)

(58) Field of Classification Search
CPC ......... G10L 15/06; G10L 15/02; G10L 15/04; G10L 15/20; G10L 15/12; G10L 2015/088; G10L 2015/081
USPC ........................................................ 704/233
See application file for complete search history.

(56) References Cited

U.S. PATENT DOCUMENTS 7,117,231 B2* 10/2006 Fischer ................ H04N 21/235
2012/0233168 A1* 9/2012 Terao ................ G06F 17/30705
707/738

* cited by examiner

*Primary Examiner* — Houshang Safaipour
*Assistant Examiner* — Bharatkumar S Shah
(74) *Attorney, Agent, or Firm* — Ronald S. Fernando (57) ABSTRACT

Various implementations disclosed herein include a training module configured to concurrently segment a plurality of vocalization instances of a voiced sound pattern (VSP) as vocalized by a particular speaker, who is identifiable by a corresponding set of vocal characteristics. Aspects of various implementations are used to determine a concurrent segmentation of multiple similar instances of a VSP using a modified hierarchical agglomerative clustering (HAC) process adapted to jointly and simultaneously segment multiple similar instances of the VSP. Information produced from multiple instances of a VSP vocalized by a particular speaker characterize how the particular speaker vocalizes the VSP and how those vocalizations may vary between instances. In turn, in some implementations, the information produced using the modified HAC process is sufficient to determine more a reliable detection (and/or matching) threshold metric(s) for detecting and matching the VSP as vocalized by the particular speaker.

20 Claims, 7 Drawing Sheets

CONCURRENT SEGMENTATION OF MULTIPLE SIMILAR VOCALIZATIONS

RELATED APPLICATIONS

This application claims the benefit of U.S. Provisional Patent Application No. 62/029,560, entitled "Systems & Methods for Speaker Dependent Voice Activity Detection," filed on Jul. 27, 2014, and which is incorporated by reference herein.

TECHNICAL FIELD

The present disclosure relates to audible signal processing, and in particular, to detecting a voiced sound pattern spoken by a particular speaker in noisy audible signal data.

BACKGROUND

The ability to recognize a voiced sound pattern (e.g., a keyword or a phrase), as vocalized by a particular speaker, is a basic function of the human auditory system. However, this psychoacoustic hearing task is difficult to reproduce using previously known machine-listening technologies because spoken communication often occurs in adverse acoustic environments that include ambient noise, interfering sounds, and background chatter of other speakers. The problem is further complicated because there is often some variation in how a particular speaker vocalizes multiple instances of the same voiced sound pattern (VSP). Nevertheless, as a hearing task, the unimpaired human auditory system is able recognize VSPs vocalized by a particular speaker effectively and perceptually instantaneously.

As a previously known machine-listening process, recognition of a VSP as vocalized by a particular speaker includes detecting and then matching a VSP to the vocal characteristics of the particular speaker. Known processes that enable detection and matching are computationally complex, use large memory allocations, and yet remain functionally limited and highly inaccurate. One persistent problem includes an inability to sufficiently train a detection and matching system using previously known machine-listening technologies. For example, hierarchical agglomerative clustering (HAC) processes have been previously used to segment a single vocalization instance of a VSP from a particular speaker as a part of a training process. However, a single vocalization instance does not provide a sufficient amount of information to reliably train a VSP detection module.

Due to the computational complexity and memory demands, previously known VSP detection and speaker matching processes are characterized by long delays and high power consumption. As such, these processes are undesirable for low-power, real-time and/or low-latency devices, such as hearing aids and mobile devices (e.g., smartphones, wearables, etc.).

SUMMARY

Various implementations of systems, methods and devices within the scope of the appended claims each have several aspects, no single one of which is solely responsible for the attributes described herein. After considering this disclosure those of ordinary skill in the art will understand how the aspects of various implementations are used to enable speaker dependent voice activity detection (SDVA). In accordance with various implementations, SDVA enables a device to detect a user selected keyword or phrase (i.e., a voiced sound pattern, VSP) in a continuous stream of audio when spoken by the specific user, and to the exclusion of other speakers. In some implementations, a SDVA system includes a training module and a detection module. The detection module uses keyword characterizations to score how well subsequently received portions of an audible signal match the keyword characterizations that are used as the basis of one or more detection (and/or matching) threshold metrics. The training module allows a user to provide multiple examples of a keyword (i.e., a VSP) that are used to enable the detection module with the one or more detection (and/or matching) threshold metrics. Identifying features of the keyword examples are extracted and characterized by the training module. In various implementations, the training module includes systems, methods and/or devices configured to concurrently segment a plurality of vocalization instances of a VSP vocalized by a particular speaker, who is identifiable by a corresponding set of vocal characteristics. In particular, after considering this disclosure those of ordinary skill in the art will understand how the aspects of various implementations are used to determine a concurrent segmentation of multiple similar instances of a VSP using a modified hierarchical agglomerative clustering (HAC) process adapted to jointly and simultaneously segment multiple similar instances of the VSP (i.e., multiple similar vocalizations).

Some implementations include a method of concurrently segmenting a plurality of vocalization instances of a VSP as vocalized by a particular speaker. In some implementations, the method includes obtaining a plurality of vocalization instances of a voiced sound pattern (VSP), wherein each of the plurality of vocalization instances of the VSP has one or more vocal characteristics of a particular speaker; generating a mapping between each of the plurality of vocalization instances of the VSP by performing a dynamic time warping process on corresponding spectral components of portions of the plurality of vocalization instances of the VSP; and concurrently segmenting the plurality of vocalization instances of the VSP using the mapping and in order to satisfy a performance condition using a modified hierarchical agglomerative clustering (HAC) process.

In some implementations, the method also includes extracting a respective set of features for each of the plurality of vocalization instances of the VSP, and wherein generating the mapping between each of the plurality of vocalization instances of the VSP is based on the extracted respective sets of features. In some implementations, extracting a respective set of features for each of the plurality of vocalization instances of the VSP includes: generating a respective set of two or more temporal frames for each of the plurality of vocalization instances of the VSP; generating a corresponding set of frequency domain representations for each of the respective sets of one or more temporal frames; compressing the corresponding sets of frequency domain representations into respective sets of Mel frequencies having dB spectra values; and producing cepstral coefficients from the Mel frequencies.

In some implementation, the method also includes: determining acoustic acceptability of each of the plurality of vocalization instances of the VSP using time domain representations of the plurality of vocalization instances of the VSP; and obtaining replacements for acoustically unacceptable vocalization instances of the VSP. In some implementations, the method also includes: determining linguistic acceptability of each of the plurality of vocalization instances of the VSP using frequency domain representations of the plurality of vocalization instances of the VSP;

and obtaining replacements for linguistically unacceptable vocalization instances of the VSP.

In some implementations, the method also includes nominally segmenting each of the plurality of vocalization instances of the VSP in order to produce a nominal segmentation that is independent of the mapping, and wherein concurrently segmenting the plurality of vocalization instances of the VSP using the mapping is based at least in part of the nominal segmentation of the plurality of vocalization instances of the VSP.

In some implementations, generating the mapping between each of the plurality of vocalization instances of the VSP includes: generating a distance matrix by determining respective frame-wise spectral feature distances between a first one of the plurality of vocalization instances of the VSP and each of respective others of the plurality of vocalization instances of the VSP, and the dynamic time warping process is applied to the distance matrix. In some implementations, generating the mapping between each of the plurality of vocalization instances of the VSP includes: utilizing a result of the dynamic time warping process in order to match frame-wise spectral features between the plurality of vocalization instances of the VSP. In some implementations, the method also includes: determining whether or not a consistency threshold is satisfied based on a result of the dynamic time warping process; and rejecting the result of the dynamic time warping process of the dynamic time warping process in response to determining that the consistency threshold is not satisfied. In some implementations, the consistency threshold is based on a function of variation between the dynamic time warping mel-frequency cepstrum coefficients (MFCCs) of the first one of the plurality of vocalization instances of the VSP, and the MFCCs of the respective others of the plurality of vocalization instances of the VSP. In some implementations, the consistency threshold is based on a function of variation between the dynamic time warping a set of spectral features of the first one of the plurality of vocalization instances of the VSP, and respective sets of spectral features of the respective others of the plurality of vocalization instances of the VSP.

In some implementations, concurrently segmenting the plurality of vocalization instances of the VSP includes: determining for each of a plurality of adjacent segment pair combinations a respective variance that would result by merging the constituent pair of adjacent segments within each respective set of segments for each of the plurality of vocalization instances of the VSP; selecting pair combinations that satisfy a merging criteria across at least the majority of the plurality of vocalization instances of the VSP; and merging the selected pair combinations to produce a preferred concurrent segmentation of the plurality of vocalization instances of the VSP. In some implementations, the merging criteria includes a differential error satisfying an error performance target. In some implementations, the error performance target includes a differential error satisfying a threshold level. In some implementations, merging is permitted for an adjacent pair when the merging criteria is satisfied across all of the plurality of vocalization instances of the VSP.

Some implementations include a system of concurrently segmenting a plurality of vocalization instances of a VSP as vocalized by a particular speaker. In some implementations, the system includes a mapping module configured to generate a mapping between each of the plurality of vocalization instances of a voiced sound pattern (VSP) by performing a dynamic time warping process on corresponding spectral components of portions of the plurality of vocalization instances of the VSP, and wherein each of the plurality of vocalization instances of the VSP has one or more vocal characteristics of a particular speaker; and a multi-VSP hierarchical agglomerative clustering (HAC) module configured to concurrently segment the plurality of vocalization instances of the VSP using the mapping and in order to satisfy a performance condition using a modified HAC process.

In some implementations, the system includes a feature extraction module configured to extract a respective set of features for each of the plurality of vocalization instances of the VSP, and wherein generating the mapping between each of the plurality of vocalization instances of the VSP is based on the extracted respective sets of features.

In some implementations, the mapping module comprises a feature analysis module configured to generate a distance matrix by determining respective frame-wise spectral feature distances between a first one of the plurality of vocalization instances of the VSP and each of respective others of the plurality of vocalization instances of the VSP, and a dynamic time warping module configured to apply a dynamic time warping process to the distance matrix. In some implementations, the system includes a frame feature mapping module configured to utilize a result of the dynamic time warping process in order to match frame-wise spectral features between the plurality of vocalization instances of the VSP.

In some implementations, the multi-VSP HAC module is configured to concurrently segment the plurality of vocalization instances of the VSP by: determining for each of a plurality of adjacent segment pair combinations a respective variance that would result by merging the constituent pair of adjacent segments within each respective set of segments for each of the plurality of vocalization instances of the VSP; selecting pair combinations that satisfy a merging criteria across at least the majority of the plurality of vocalization instances of the VSP; and merging the selected pair combinations to produce a preferred concurrent segmentation of the plurality of vocalization instances of the VSP.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the drawings.

DETAILED DESCRIPTION

Numerous details are described herein in order to provide a thorough understanding of the example implementations illustrated in the accompanying drawings. However, the invention may be practiced without many of the specific details. And, well-known methods, components, and circuits have not been described in exhaustive detail so as not to unnecessarily obscure more pertinent aspects of the implementations described herein.

Previously known hierarchical agglomerative clustering (HAC) processes, which are limited to segmenting merely a single vocalization instance of a VSP, cannot be used to jointly and simultaneously segment multiple similar instances of the VSP. As noted above, a single vocalization instance does not provide a sufficient amount of information to reliably train a VSP detection system—especially when successful VSP detection is intended to be limited to vocalizations of a particular speaker (i.e., speaker dependent detection). Consequently, the use of previously known HAC processes produces functionally limited and highly inaccurate VSP detection systems.

By contrast, various implementations disclosed herein include a training module configured to concurrently segment a plurality of vocalization instances of a VSP as vocalized by a particular speaker, who is identifiable by a corresponding set of vocal characteristics. Aspects of various implementations are used to determine a concurrent segmentation of multiple similar instances of a VSP using a modified HAC process adapted to jointly and simultaneously segment multiple similar instances of the VSP. In some implementations, each of the instances of the VSP are divided into the same number of segments ($N_S$). In other words, each of the multiple similar vocalization instances of the VSP is segmented into the same number of segments ($N_S$) as the other vocalization instances. In accordance with the concurrent segmentation, corresponding segments from two or more respective vocalization instances are aligned and mapped to one another based on matched spectral features, and not necessarily based on specific and matching temporal points. In some implementations, having the same number of segments ($N_S$) for each VSP enables the generation and utilization of a common set of segment templates for the VSP, which reduces memory allocation, processor usage, and ultimately power consumption. Moreover, information produced from multiple instances of a VSP vocalized by a particular speaker characterize how the particular speaker vocalizes the VSP and how those vocalizations may vary between instances. In turn, in some implementations, the information produced using the modified HAC process is sufficient to determine more a reliable detection (and/or matching) threshold metric(s) for detecting and matching the VSP as vocalized by the particular speaker.

Figure 1:
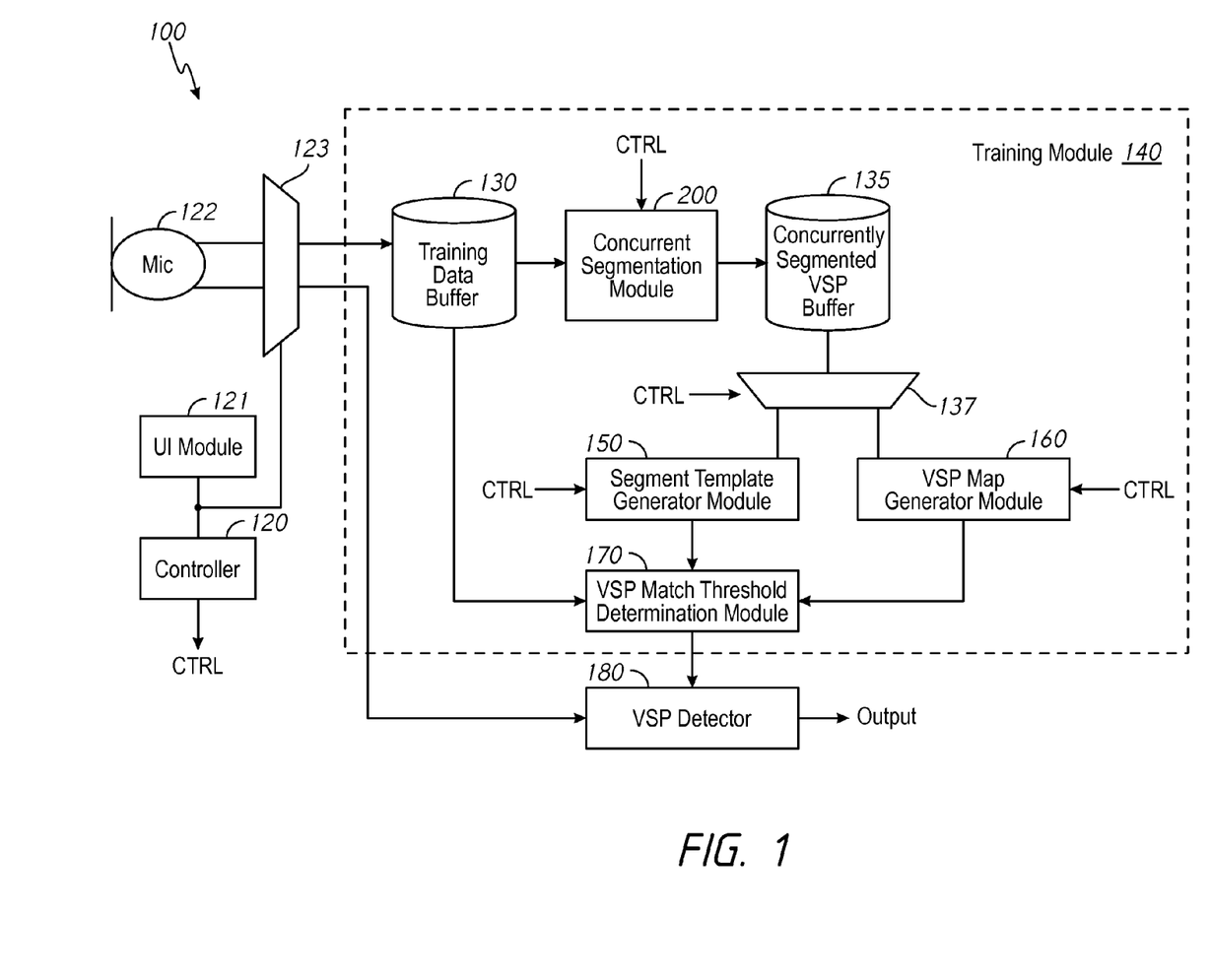
FIG. 1 is a block diagram of a VSP detection system configured to detect VSPs as vocalized by a particular speaker in accordance with some implementations.

FIG. 1 is a block diagram of a VSP detection system 100 provided to detect VSPs as vocalized by a particular speaker in accordance with some implementations. In various implementations, the VSP detection system 100 is included in a device or system operable for one or more machine-listening applications, such as a computer, a laptop computer, a tablet device, a mobile phone, a smartphone, a wearable (e.g., a smart watch) a gaming device, and a hearing aid. So while pertinent features are illustrated, those of ordinary skill in the art will appreciate from the present disclosure that various other features have not been illustrated for the sake of brevity and so as not to obscure more pertinent aspects of the implementations disclosed herein. Also, those of ordinary skill in the art will appreciate from the present disclosure that the functions of the modules described below can be combined into one or more modules and/or further sub-divided into additional sub-modules; and, that the modules described below are provided as merely one example configuration of the various aspects and functions described herein.

To that end, as a non-limiting example, in some implementations, the VSP detection system 100 includes a microphone 122, a multiplexer (MUX) 123, a user interface (UI) module 121, a controller 120, a VSP detector module 180, and a training module 140. As shown in FIG. 1, the microphone 122 is selectively connectable to both the training module 140 and the VSP detector module 180 through the MUX 123. In some implementations, the MUX 123 is used to coordinate switching between a training mode and a detection mode. In the training mode, the MUX 123 is used to couple the microphone 122 to the training module 140. In a detection mode, the MUX 123 is used to couple the microphone 122 to the VSP detector module 180. Mode-based selection and switching are enabled by the controller 120. In some implementations, the training module 140 is provided separately.

In some implementations, mode selection and/or switching is responsive to a user input received through the UI module 121. In some implementations, the UI module 121 includes one or more processors, one or more types of memory, a display and/or other user interface components such as a keyboard, a touch screen display, a mouse, a track-pad, a digital camera and/or any number of supplemental devices to add functionality.

In some implementations, the microphone 122 (e.g., one or more audio sensors) is provided to receive and convert sound into an electronic signal that can be stored in a non-transitory memory, and which is referred to as audible signal data herein. In many situations, the audible signal is captured from an adverse acoustic environment, and thus likely includes ambient noise, interfering sounds and background chatter in addition to the target voice of interest. In many applications, a received audible signal is an ongoing or continuous time series. In turn, in some implementations, a times series conversion module (e.g., windowing module 211 shown in FIG. 2) is configured to generate two or more temporal frames of audible signal data from a stream of audible signal data. Each temporal frame of the audible signal data includes a temporal portion of the audible signal received by the microphone 122.

In some implementations, the VSP detector module 180 uses at least one detection threshold metric (e.g., speaker dependent VSP feature characterizations), provided by the training module 140, for detecting and matching the VSP as vocalized by the particular speaker. The at least one detection threshold metric is used to score how well subsequently received portions of an audible signal match extracted speaker dependent VSP features that have been extracted from multiple instances of the VSP during a training mode. In other words, the training module 140 allows a user to provide multiple examples of a VSP that are used to enable the VSP detection module 180 with a more reliable set of one or more detection threshold metrics.

In some implementations, the training module 140 includes a training data buffer 130, a concurrent segmentation module 200, a concurrently segmented VSP buffer 135, an optional MUX 137, a segment template generator module 150, a VSP map generator module 160, and a VSP match (i.e., detection) threshold determination module 170.

In some implementations, the training data buffer 130 is used to store and receive a number of similar vocalization instances of a VSP provided by a user—who in some implementations is first authenticated. As would be understood by those of ordinary skill in the art, two separate words or phrases (e.g., "apple" and "orange") are not considered similar vocalization instances of the same VSP because they do not have at least loosely matching spectral components. However, two separate utterances of the same word by the same speaker can be considered similar vocalization instances, when the two separate utterances are not intentionally spoken with exceeding amounts of variation. In such cases, even accounting for natural variation is a speaker's voice, the two separate utterances of the same word have at least loosely matching spectral components that are a function of the speaker's vocalization system.

As described in greater detail below, with reference to FIG. 2, the concurrent segmentation module 200 is configured to jointly and simultaneously segment multiple similar vocalization instances of the VSP in order to produce a concurrent segmentation applicable across all of the multiple similar vocalization instances of the VSP. In other words, each of the multiple similar vocalization instances of the VSP is segmented into the same number of segments ($N_S$) as the other vocalization instances. In accordance with the concurrent segmentation, corresponding segments from two or more respective vocalization instances are aligned and mapped to one another based on matched spectral features, and not necessarily based on specific and matching temporal points. The concurrent segmentation module 200 then stores the concurrent segmentation of the multiple similar vocalization instances of the VSP in the concurrently segmented VSP buffer 135.

In some implementations, the segment template generator module 150 and the VSP map generator module 160 are configured to produce additional speaker dependent VSP characterizations using the concurrent segmentation of the multiple similar vocalization instances of the VSP stored in the concurrently segmented VSP buffer 135. In turn, the VSP match threshold determination module 170 utilizes the VSP characterizations provided by the segment template generator module 150 and the VSP map generator module 160, as well as additional raw training data (e.g., a relatively unprocessed VSP vocalization instance) from the training data buffer 130, in order to produce a more reliable set of one or more detection threshold metrics suitable for the VSP detection module 180.

The controller 120 is coupled to each of the aforementioned in order to coordinate the operation of the VSP detection system 100. More specifically, the controller 120 is connected to provide the training module 140 with control commands and/or instructions that direct the training module 140 to produce one or more detection threshold metrics based on a concurrent segmentation of multiple instances of a VSP as vocalized by a particular speaker. The controller 120 is also coupled to the MUX 123 in order to effectuate mode-based selection and switching, as described above. The VSP detector module 180 is configured to use keyword characterizations to score how well subsequently received portions of an audible signal match the speaker dependent keyword characterizations that are used as the basis of one or more detection (and/or matching) threshold metrics (provided by the training module 140).

Figure 2:
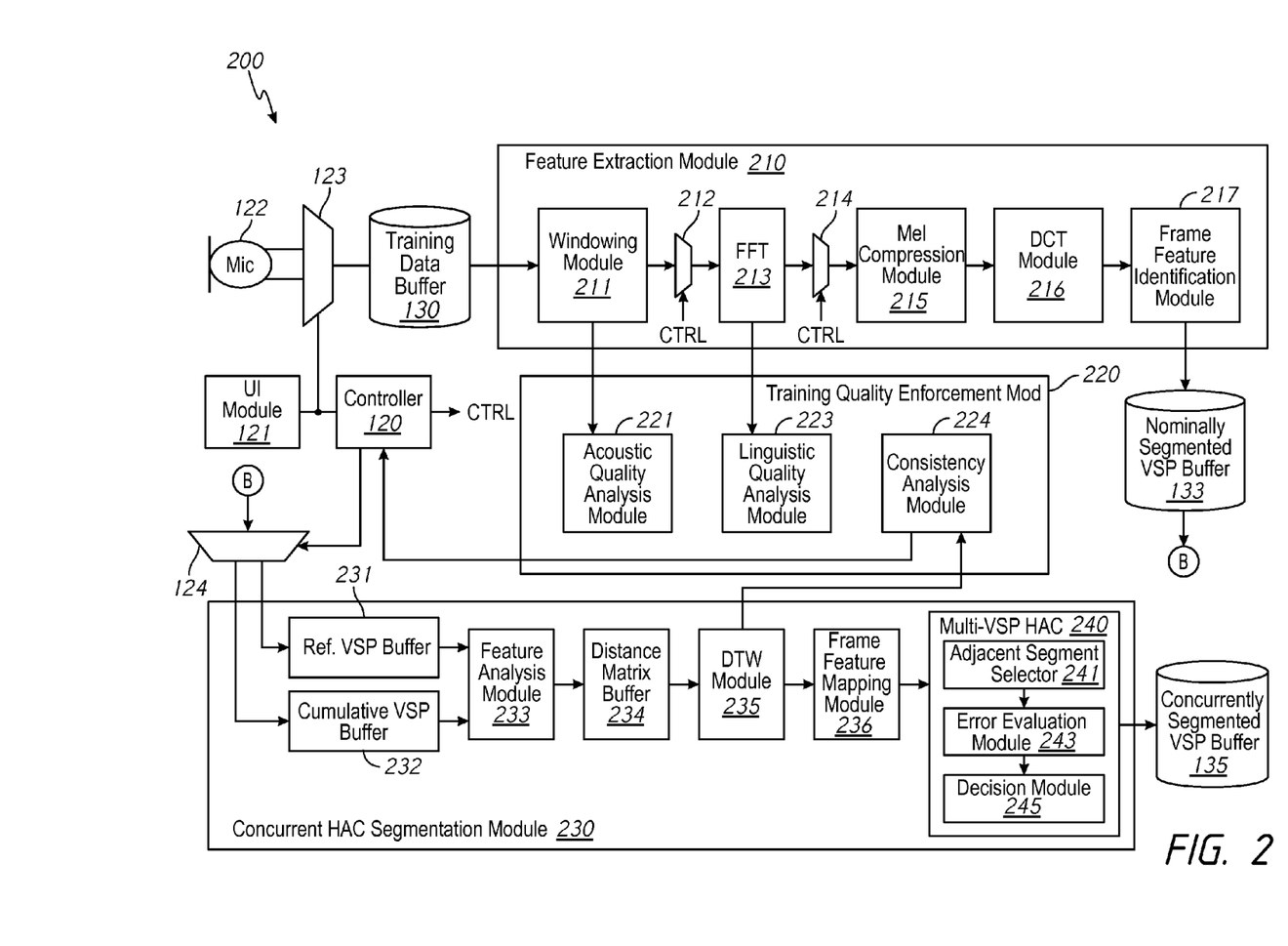
FIG. 2 is a block diagram of a segmentation module configured to determine a concurrent segmentation of multiple instances of a VSP according to some implementations.

FIG. 2 is a block diagram of the concurrent segmentation module 200 included in the VSP detection system 100 of FIG. 1 in accordance with some implementations. Portions of FIG. 2 are adapted from FIG. 1, and so elements common to each include common reference numbers, and only the differences between FIGS. 1 and 2 are described herein for the sake of brevity. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the concurrent segmentation module 200 includes a feature extraction module 210, a training quality enforcement module 220, and a concurrent HAC segmentation module 230. The concurrent segmentation module 200 also includes a training data buffer 130, a nominally segmented VSP buffer 133, a reference VSP buffer 231, a cumulative VSP buffer 232, and a concurrently segmented VSP buffer 135.

In some implementations, the feature extraction module 210 includes a windowing module 211, a Fast Fourier Transform (FFT) module 213, a Mel compression module 215, a DCT module 216, and a frame feature identification module 217.

In some implementations, the windowing module 211 is configured to mark and separate a set of one or more temporal frames of each of the plurality of vocalization instances (i.e., audible signal data) of the VSP for frame boundary times $t_1, t_2, \ldots, t_n$. In some implementations, each temporal frame is optionally conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of audible signal data. Additionally and/or alternatively, in some implementations, the windowing module 211 configured to retrieve the audible signal data from a non-transitory memory (e.g., training data buffer 130). Additionally and/or alternatively, in some implementations, pre-filtering includes filtering the received audible signal using a low-noise amplifier (LNA) in order to substantially set a noise floor. In some implementations, a pre-filtering LNA is arranged between the microphone 122 and the MUX 123. Those of ordinary skill in the art will appreciate that numerous other pre-filtering techniques may be applied to the received audible signal, and those discussed are merely examples of numerous pre-filtering options available.

In some implementations, a MUX 212 is provided between the windowing module 211 and the FFT module 213. The MUX 212 is provided in order to regulate and/or operation of the feature extraction module 210 while training data is assessed for acoustic acceptability, as described in more detail below. In some implementations, until a sufficient amount of acoustically acceptable training data is obtained, the controller 120 provides a control signal to the MUX 212 to prevent transfer of training data from the windowing module 211 to the FFT module 213. To that end, the MUX 212 is arranged to receive a control signal from the controller 120. Additionally and/or alternatively, a MUX (not shown) is provided between the training data buffer 130 and the windowing module 211, and is similarly controlled by the controller 120.

In some implementations, the FFT module 213 is configured to generate a corresponding frequency domain representation for each of the one or more temporal frames in each respective set corresponding to the plurality of vocalization instances of the VSP. The FFT module 213 operates to generate a corresponding frequency domain representation for each of the one or more temporal frames, so that one or more spectral characteristics of the audible signal data (i.e., the vocalization instances of the VSP) can be determined for each frame. In some implementations, spectral characteristics include, without limitation, spectral centroid, spectral flux and MFCCs, in addition to other known to those of ordinary skill in the art. In some implementations, the frequency domain representation of a temporal frame includes at least one of a plurality of sub-bands contiguously distributed throughout the frequency spectrum associated with voiced sounds. In some implementations, a 32 point short-time FFT is used for the conversion. Those of ordinary skill in the art will appreciate that any number of FFT implementations are used in various implementations. Additionally and/or alternatively, the FFT module 213 may also be replaced with any suitable implementation of one or more low pass filters, such as for example, a bank of IIR filters. Additionally and/or alternatively, the FFT module 213 may also be replaced with any suitable implementation of a gamma-tone filter bank, a wavelet decomposition module, and a bank of one or more interaural intensity difference (IID) filters. In some implementations, an optional spectral filter module (not shown) is configured to receive and adjust the spectral composition of the frequency domain representations of the one or more frames. In some implementations, for example, the spectral filter module is configured to one of emphasize, deemphasize, and/or isolate one or more spectral components of a temporal frame of the audible signal in the frequency domain.

In some implementations, a MUX 214 is provided between the FFT module 213 and the Mel compression module 215. The MUX 214 is provided in order to regulate and/or operation of the feature extraction module 210 while training data (e.g., vocalization instances of the VSP) is assessed for linguistic acceptability, as described in more detail below. In some implementations, until a sufficient amount of linguistically acceptable training data is obtained, the controller 120 provides a control signal to the MUX 214 to prevent transfer of training data from the FFT module 213 to the Mel compression module 215. To that end, the MUX 214 is arranged to receive a control signal from the controller 120.

In some implementations, the Mel compression module 215 is configured to compress the respective sets of frame-wise frequency domain representations (of the VSP vocalization instances) into a set of Mel frequencies having dB spectra values. In some implementations, the DCT module 216 is configured to apply a discrete cosine transform to the compressed dB spectra values in order to produce the cepstral coefficients.

In some implementations, the frame feature identification module 217 is configured to select 19 MFCCs per frame for each of the plurality of vocalization instances of the VSP. In some implementations, the frame feature identification module 217 is configured to assess and obtain the characteristics of spectral features (i.e., a feature characterization set) in each of the frequency domain representations of the one or more frames of the audible signal data. In various implementations, a feature characterization set includes any of a number and/or combination of signal processing features, such as spectra, cepstra, mel-scaled cepstra, pitch, a signal-to-noise ratio (SNR), a voice strength estimate, and a voice period variance estimate. In some implementations, for example, the frame feature identification module 217 includes one or more sub-modules that are configured to analyze the frames in order to obtain spectral feature characterization data. The selected frame-wise MFCCs are stored in the nominally segmented VSP buffer 133 and indexed by respective vocalization instance identifiers corresponding to the plurality of vocalization instances of the VSP.

Additionally and/or alternatively, for example, in various implementations, frame feature identification module 217 includes a cepstrum analysis sub-module, a pitch estimation sub-module, a mel-frequency cepstrum coefficients analysis sub-module, a SNR estimation sub-module, a voice strength estimation sub-module, and a voice period variance estimation sub-module. Those of ordinary skill in the art will appreciate from the present disclosure that the functions of the aforementioned sub-modules can be combined into one or more sub-modules and/or further sub-divided into additional sub-modules and/or included in portions of the training quality enforcement module 200; and, that the aforementioned sub-modules are provided as merely one example configuration of the various aspects and functions described herein.

In some implementations, the cepstrum analysis sub-module is configured to determine the Fourier Transform (FT) of the logarithm of a frequency domain representation of a temporal frame. In some implementations, the pitch estimation sub-module is configured to provide a pitch estimate of voice activity in an audible signal. As known to those of ordinary skill in the art, pitch is generally an estimation of a dominant frequency characterizing a corresponding series of glottal pulses associated with voiced sounds. As such, the pitch estimation sub-module is configured to identify the presence of regularly-spaced transients generally corresponding to glottal pulses characteristic of voiced speech. In some implementations, the transients are identified by relative amplitude and relative spacing. In some implementations, the mel-frequency cepstrum coefficients (MFCCs) analysis sub-module is configured to provide a representation of the short-term power spectrum of a frequency domain representation of a temporal frame. Typically, the short-term power spectrum is based on a linear cosine transform on a log power spectrum on a non-linear mel scale of frequency. In some implementations, the SNR estimation sub-module is configured to estimate the signal-to-noise ratio in one or more of the frequency domain representations of the temporal frames. In some implementations, the voice strength estimation sub-module is configured to provide an indicator of the relative strength of the target or dominant voice signal in a frame. In some implementations, the relative strength is measured by the number of detected glottal pulses, which are weighted by respective correlation coefficients. In some implementations, the relative strength indicator includes the highest detected amplitude of the smoothed inter-peak interval accumulation produced by an accumulator function. In some implementations, the voice period variance estimation sub-module is configured to estimate the pitch variance in one or more of the frequency domain representations of the temporal frames. In other words, the voice period variance estimator provides an indicator for each sub-band that indicates how far the period detected in a sub-band is from the dominant voice period P. In some implementations the variance indicator for a particular sub-band is determined by keeping track of a period estimate derived from the glottal pulses detected in that particular sub-band, and comparing the respective pitch estimate with the dominant voice period P.

In some implementations, the training quality enforcement module 220 includes an acoustic quality analysis module 221, a linguistic quality analysis module 223, and consistency analysis module 224. In some implementations, the acoustic quality analysis module 221 is configured to determine acoustic acceptability as described below. In some implementations, the linguistic quality analysis module 223 is configured to determine linguistic acceptability as described below. In some implementations, the consistency analysis module 224 is configured to determine whether or not a function of the variation between DTW MFCCs and the MFCCs of the reference VSP vocalization instance breaches a threshold performance metric, as described below.

In some implementations, the concurrent HAC segmentation module 230 includes a feature analysis module 233, a distance matrix 234, a DTW module 235, a frame feature mapping module 236, and a multi-VSP HAC module 240. In some implementations, the feature analysis module 233 is configured to determine respective frame-wise spectral feature distances between each of the cumulative VSP vocalization instances, stored in the cumulative VSP buffer 232, and the reference VSP vocalization instance, stored in the reference VSP buffer 231. The feature analysis module 233 stores resulting distance matrix in the distance matrix buffer 234. In some implementations, the DTW module 235 is configured to perform dynamic time warping on the distance matrix stored in the distance matrix buffer 234. In some implementations, the frame feature mapping module 236 is configured to use the DTW result to map spectral features of the cumulative VSP vocalization instances to spectral features of the VSP vocalization instance in order to produce a segment mapping. In some implementations, the multi-VSP HAC module 240 is configured to perform the modified HAC process, in accordance with various implementations, in order to adjust the segmentation of the plurality of vocalization instances of the VSP. Subsequently, each vocalization instances of the VSP in the resulting concurrent segmentation includes the same number of segments ($N_S$) as the other vocalization instances. However, in accordance with the concurrent segmentation, corresponding segments from two or more respective vocalization instances are aligned and mapped to one another based on matched spectral features, and not necessarily based on specific and matching temporal points or time markers. The operation of the concurrent HAC segmentation module 230 is described in further detail below with reference to the flowcharts provided in FIGS. 4 and 5.

Figure 3:
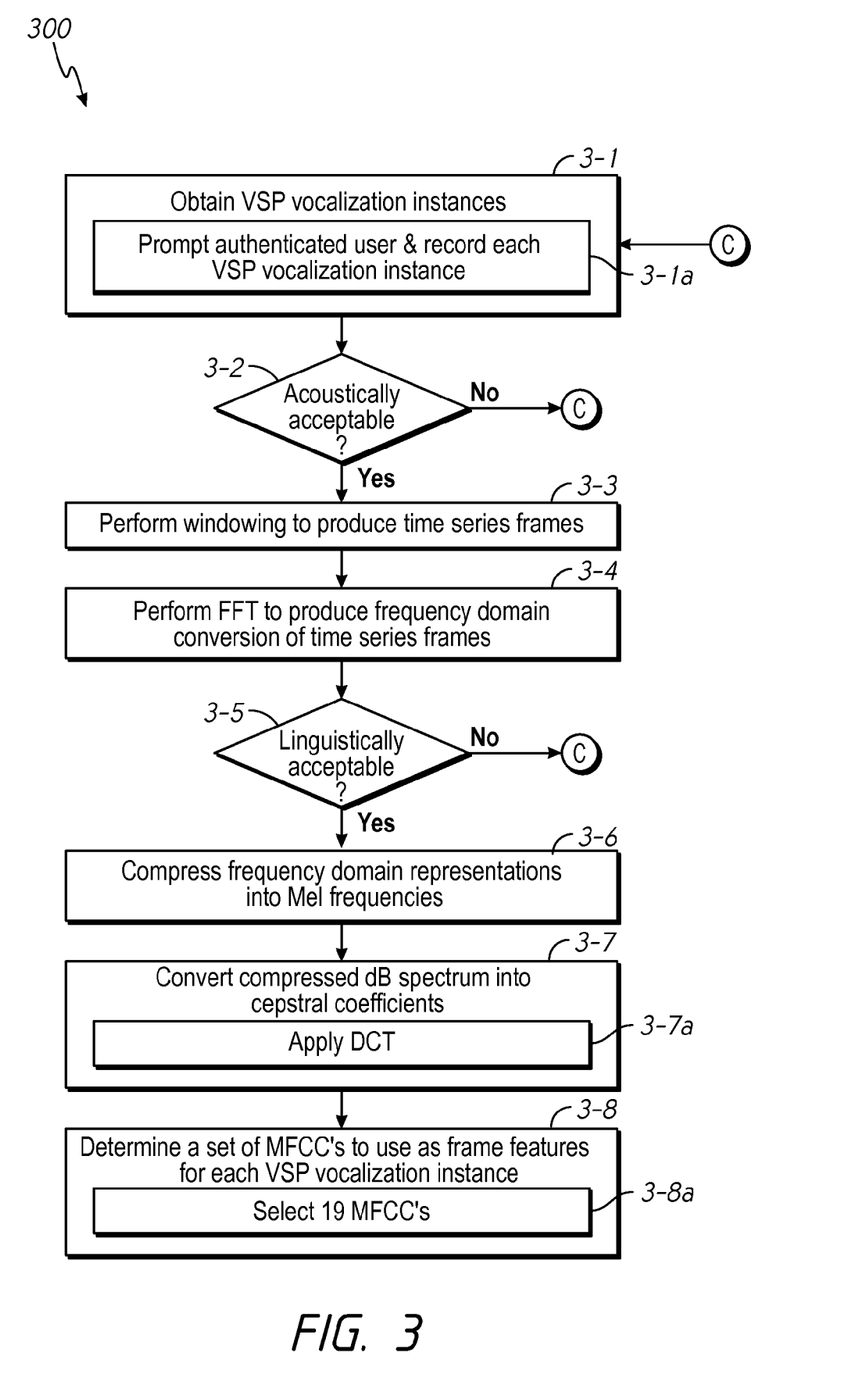
FIG. 3 is a flowchart representation of a method of identifying frame features for each of multiple instances of a VSP in accordance with some implementations.

FIG. 3 is a flowchart representation of a method 300 of identifying frame features for each of multiple vocalization instances of a VSP in accordance with some implementations. In some implementations, with continued reference to FIG. 2, the method 300 is performed by the training module 140, and in particular, by the feature extraction module 210 in coordination with the controller 120 and the training quality enforcement module 220. Briefly, the method 300 includes obtaining a plurality of vocalization instances of a VSP (e.g., a keyword or a phrase), and determining a corresponding plurality of mel-frequency cepstrum coefficients (MFCCs) for each of the plurality of vocalization instances of the VSP. The method 300 is configured to accept vocalization instances of the VSP that are sufficiently similar to one another, and reject vocalization instances that are not sufficiently similar. For example, as would be understood by those of ordinary skill in the art, two separate words or phrases (e.g., "apple" and "orange") are not considered similar vocalization instances of the same VSP because they do not have at least loosely matching spectral components. However, two separate utterances of the same word by the same speaker can be considered similar vocalization instances, when the two separate utterances are not intentionally spoken with exceeding amounts of variation. In such cases, even accounting for natural variation is a speaker's voice, the two separate utterances of the same word have at least loosely matching spectral components that are a function of the speaker's vocalization system.

As represented by block 3-1, the method 300 includes obtaining a plurality of vocalization instances of a VSP from a particular speaker, identifiable by a corresponding set of vocal characteristics. As represented by block 3-1a, in some implementations, obtaining a plurality of vocalization instances of the VSP includes prompting an authenticated user (i.e., a particular speaker) to speak and record the plurality of vocalization instances of the VSP. For example, with reference to FIG. 2, the UI module 121 is used to prompt the authenticated user to speak and record a plurality of vocalization instances of the VSP (e.g., the VSP includes the word "Vancouver"). The training data buffer 130 stores the plurality of vocalization instances of the VSP. In some implementations, obtaining a plurality of vocalization instances of the VSP includes retrieving and/or receiving vocalization instances of the VSP associated with a particular speaker from a non-transitory memory, such as the training data buffer 130.

As represented by block 3-2, the method 300 includes determining whether or not each of the plurality of vocalization instances of the VSP is acoustically acceptable. For example, with reference to FIG. 2, the acoustic quality analysis module 221, included in the training quality enforcement module 220, is configured to determine acoustic acceptability. In some implementations, determining acoustical acceptability of a vocalization instance of a VSP includes assessing the amplitude of a vocalization instance. In some implementations, an acoustically acceptable vocalization instance has an amplitude within a preferred range, and thus, a vocalization instance is acoustically unacceptable when its amplitude is outside of the preferred range. For example, in some implementations, a preferred range includes a peak amplitude of −25 dB to 0 dB assuming that the signal is digitized. In some implementations, determining acoustical acceptability of a vocalization instance of a VSP includes assessing the signal-to-noise ratio (SNR) of the vocalization instance. In some implementations, an acoustically acceptable vocalization instance of the VSP has a SNR satisfying a performance level value, and thus, a vocalization instance is acoustically unacceptable when the SNR breaches the performance level value. For example, in some implementations, a SNR of at least 10 dB is acceptable. In some implementations, determining acoustical acceptability of a vocalization instance of a VSP includes determining whether or not the vocalization instance is a complete example of the VSP as intended by the user. In some implementations, a vocalization instance of a VSP is acoustically unacceptable when it is incomplete. For example, if the VSP as intended by the user includes the word "monkey," then a vocalization instance that instead includes "monk" is acoustically unacceptable because it is incomplete as intended by the user.

If one or more of the plurality of vocalization instances of the VSP are not acoustically acceptable ("No" path from block 3-2), the method 300 includes circling back to the portion of the method represented by block 3-1 in order to obtain one or more additional vocalization instances of the VSP as replacements for the acoustically unacceptable vocalization instances of the VSP. In some implementations, the method 300 includes circling back to the portion of the method represented by block 3-1 until a sufficient number of acoustically acceptable vocalization instances are obtained. On the other hand, if the plurality of vocalization instances of the VSP are acoustically acceptable ("Yes" path from block 3-2), as represented by block 3-3, the method 300 includes performing windowing to produce a respective set of time series frames for each of the plurality of vocalization instances of the VSP. For example, with reference to FIG. 2, the windowing module 211 is configured to mark and separate a set of one or more temporal frames of each of the plurality of vocalization instances of the VSP for frame boundary times $t_1, t_2, \ldots, t_n$. Each respective set of one or more temporal frames provides the initial segmentation of a corresponding one of the plurality of vocalization instances of the VSP (which is later adjusted using a modified HAC process in accordance with some implementations as described below with reference to FIGS. 4 and 5). As represented by block 3-4, the method 300 includes performing an FFT (or the like) in order to produce a frequency domain conversion of the respective sets of time series frames corresponding to the plurality of vocalization instances of the VSP. For example, with reference to FIG. 2, the FFT module 213 operates to generate a corresponding frequency domain representation for each of the one or more temporal frames in each respective set corresponding to the plurality of vocalization instances of the VSP. That is, each set of temporal frames for a corresponding one of the plurality of vocalization instances of the VSP is converted to a respective set of frame-wise frequency domain representations.

As represented by block 3-5, the method 300 includes determining whether or not each of the plurality of vocalization instances of the VSP is linguistically acceptable. For example, with reference to FIG. 2, the linguistic quality analysis module 223, included in the training quality enforcement module 220, is configured to determine linguistic acceptability. In some implementations, determining linguistic acceptability of a vocalization instance of a VSP includes analyzing the spectrum shape and frequency content of a vocalization instance in order to identify occurrences of vowels and fricatives. In some implementations, the occurrences of vowels and fricatives are identified by sufficient levels spectral variation. In some implementations, a linguistically acceptable vocalization instance of the VSP has a sufficient amount of spectral variation. For example, in some implementations, the amount of variation is implementation specific in terms of what is being measured (e.g., power spectrum, dB spectrum, Cepstrum).

If one or more of the plurality of vocalization instances of the VSP are not linguistically acceptable ("No" path from block 3-5), the method 300 includes circling back to the portion of the method represented by block 3-1 in order to obtain one or more additional vocalization instances of the VSP as replacements for the linguistically unacceptable vocalization instances of the VSP. In some implementations, the method 300 includes circling back to the portion of the method represented by block 3-1 until a sufficient number of linguistically acceptable vocalization instances are obtained. On the other hand, if the plurality of vocalization instances of the VSP are linguistically acceptable ("Yes" path from block 3-5), as represented by block 3-6, the method 300 includes compressing each respective set of frame-wise frequency domain representations into a set of Mel frequencies in order to convert the power spectra to dB spectra values. For example, with reference to FIG. 2, the Mel compression module 215 is configured to compress the respective sets of frame-wise frequency domain representations (of the VSP vocalization instances) into a set of Mel frequencies having dB spectra values.

As represented by block 3-7, the method 300 includes converting the compressed dB spectra values into cepstral coefficients. As represented by block 3-7a, in some implementations, converting the compressed dB spectra values into cepstral coefficients includes applying a discrete cosine transform (DCT). For example, with reference to FIG. 2, the DCT module 216 is configured to apply a discrete cosine transform to the compressed dB spectra values in order to produce the cepstral coefficients. As represented by block 3-8, the method 300 includes determining a set of MFCCs to use as frame features for each of the plurality of vocalization instances of the VSP. As represented by block 3-8a, in some implementations, determining a set of MFCCs to use as frame features includes selecting 19 MFCCs per frame. For example, with reference to FIG. 2, the frame feature identification module 217 is configured to select 19 MFCCs per frame for each of the plurality of vocalization instances of the VSP. The selected frame-wise MFCCs are stored in the nominally segmented VSP buffer 133 and indexed by respective vocalization instance identifiers corresponding to the plurality of vocalization instances of the VSP. As noted above, each respective set of one or more temporal frames, generated by the windowing module 211, provides the initial segmentation of a corresponding one of the plurality of vocalization instances of the VSP.

Figure 4:
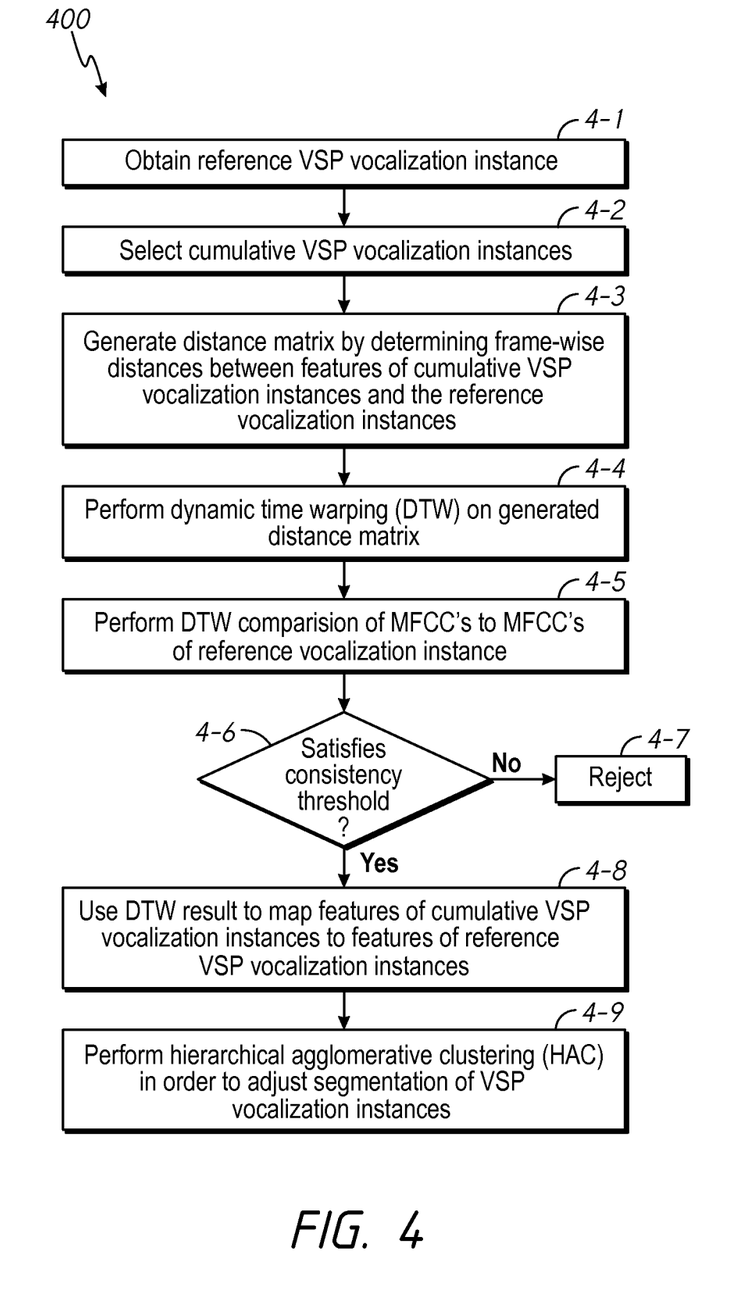
FIG. 4 is a flowchart representation of a method of mapping frame features for each of multiple instances of a VSP to one another according to some implementations.

FIG. 4 is a flowchart representation of a method 400 of mapping frame features for each of multiple vocalizations instances of a VSP to one another according to some implementations. In some implementations, with continued reference to FIG. 2, the method 400 is performed by the training module 140, and in particular, by portions of the concurrent HAC segmentation module 230 in coordination with the controller 120 and the training quality enforcement module 220. Briefly, the method 400 includes frame-wise mapping of features from each of a plurality of vocalizations instances of a VSP to one another, by utilizing dynamic time warping (DTW), in order to enable a modified HAC process in accordance with some implementations (described with reference to FIG. 5).

To that end, as represented by block 4-1, the method 400 includes obtaining a set of frame-wise MFCCs for one of the plurality of vocalization instances of the VSP to serve as a reference VSP vocalization instance. For example, with reference to FIG. 2, the controller 120 selects a set of frame-wise MFCCs for one of the plurality of vocalization instances of the VSP from the nominally segmented VSP buffer 133. The controller 120 also provides a control signal to the MUX 124 in order to write the selected set of frame-wise MFCCs into the reference VSP buffer 231. As represented by block 4-2, the method 400 includes selecting one or more other sets of frame-wise MFCCs associated with one or more the remaining plurality of vocalization instances of the VSP to serve as cumulative VSP vocalization instances that are mapped to the reference VSP vocalization instance in accordance with remaining portions of the method. For example, with reference to FIG. 2, the controller 120 selects one or more sets of frame-wise MFCCs for one or more of the remaining plurality of vocalization instances of the VSP from the nominally segmented VSP buffer 133. The controller 120 also provides a control signal to the MUX 124 in order to write the selected sets of frame-wise MFCCs into the cumulative VSP buffer 232.

As represented by block 4-3, the method 400 includes generating a distance matrix by determining respective frame-wise distances between each of the cumulative VSP vocalization instances and the reference VSP vocalization instance. For example, with reference to FIG. 2, the feature analysis module 233 determines the respective frame-wise distances between each of the cumulative VSP vocalization instances, stored in the cumulative VSP buffer 232, and the reference VSP vocalization instance, stored in the reference VSP buffer 231. The feature analysis module 233 stores resulting distance matrix in the distance matrix buffer 234.

As represented by block 4-4, the method 400 includes performing dynamic time warping (DTW) on the distance matrix. For example, with reference to FIG. 2, the DTW module 235 performs dynamic time warping on the distance matrix stored in the distance matrix buffer 234. As would be understood by those of ordinary skill in the art, a DTW process accepts first and second VSP vocalizations instances as inputs and returns a mapping between frames of the first VSP vocalization instance to the frames of the second VSP vocalization instance input. In some embodiments, the mapping provided by DTW satisfies one or more performance criteria. For example, in some implementations, one constraint includes disallowing pairs of VSPs that have frame mappings that deviate too far away from a main diagonal (e.g., the absolute value of an index delta for a frame mapping is bounded to be less than some maximum threshold, such a 4 or 5 frames). In accordance with some implementations, the aforementioned DTW process is adapted to receive two or more cumulative VSP vocalization instances in order to generate a set of related frames by iteratively adding to the mapping for each of the two or more cumulative VSP vocalization instances. In other words, once an initial mapping between the reference VSP vocalization instance and a first cumulative VSP vocalization instance is generated, the initial mapping is supplemented by adding a mapping from a second VSP vocalization instance in order to produce an updated mapping. The updated mapping is similarly iteratively updated for each of the remaining two or more cumulative VSP vocalization instances.

As represented by block 4-5, the method 400 includes performing a comparison of MFCCs produced by DTW to MFCCs of the reference VSP vocalization instance in order subsequently to determine whether or not a training quality metric is satisfied. In some implementations, a training quality metric includes a consistency threshold that is a function of the variation between the DTW MFCCs and the MFCCs of the reference VSP vocalization instance. As represented by block 4-6, the method 300 includes determining whether or not the consistency threshold is satisfied. For example, with reference to FIG. 2, the consistency analysis module 224, included in the training quality enforcement module 220, is configured to determine whether or not a function of the variation between DTW MFCCs and the MFCCs of the reference VSP vocalization instance breaches a threshold performance metric.

If the function of the variation breaches the threshold performance metric ("No" path from block 4-6), as represented by block 4-7, the method 400 includes rejecting the results of the training process. On the other hand, if the function of the variation is acceptable ("Yes" path from block 4-6), as represented by block 4-8, the method 400 includes using the DTW result to map features of the cumulative VSP vocalization instances to features of the reference VSP vocalization instance. For example, with reference to FIG. 2, the frame feature mapping module 236 is configured to use the DTW result to map features of the cumulative VSP vocalization instances to features of the VSP vocalization instance in order to produce a segment mapping.

As represented by block 4-9, the method 400 includes performing a modified HAC process, in accordance with various implementations, in order to adjust the segmentation of the plurality of vocalization instances of the VSP. For example, with reference to FIG. 2, the multi-VSP HAC module 240 is configured to perform the modified HAC process, in accordance with various implementations, in order to adjust the segmentation of the plurality of vocalization instances of the VSP. An example of the operation of the multi-VSP HAC module 240 is described below with reference to FIG. 5.

Figure 5:
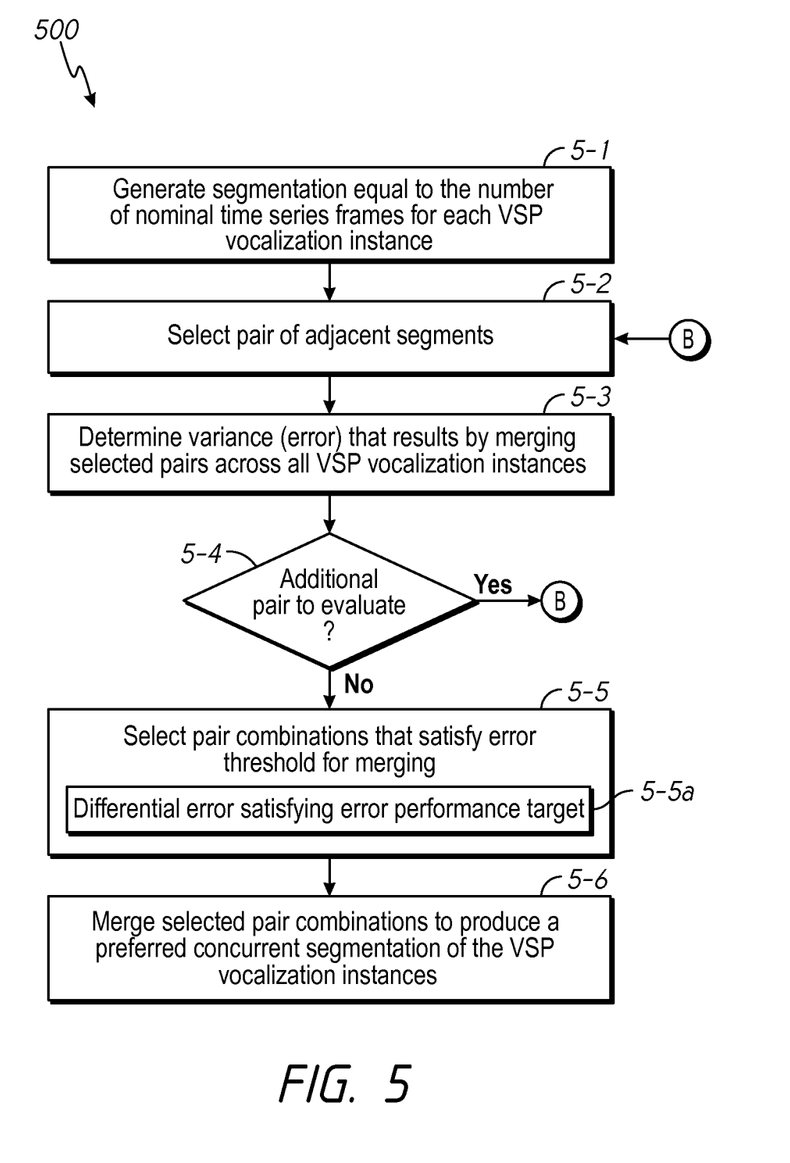
FIG. 5 is a flowchart representation of a method of determining a concurrent segmentation of multiple instances of a VSP using a modified hierarchical agglomerative clustering (HAC) process in accordance with some implementations.

FIG. 5 is a flowchart representation of a method 500 of determining a concurrent segmentation of multiple instances of a VSP using a modified HAC process in accordance with some implementations. In some implementations, with continued reference to FIG. 2, the method 500 is performed by the training module 150, and in particular, by the multi-VSP HAC module 240 in coordination with the controller 120. Briefly, the method 500 includes extending a HAC process to jointly generate a preferred segmentation for a plurality of vocalization instances of a VSP by utilizing a mapping between segments of a reference VSP vocalization instance and respective segments of a number of cumulative vocalization instances (as generated above in accordance with aspects described above with reference to FIG. 4). In accordance with various implementations, a modified HAC process includes adjusting the segmentation across the plurality of vocalization instances of the VSP by iteratively merging adjacent segments that together satisfy a merging criteria across at least the majority of the plurality of vocalization instances of the VSP. In some implementations, merging is permitted for an adjacent pair when the merging criteria is satisfied across all of the plurality of vocalization instances of the VSP.

As represented by block 5-1, the method 500 includes generating an initial segmentation having a number of segments equal to a number of previously generated time series frames for each of the plurality of vocalization instances of a VSP. In other words, in some implementations, the method 500 receives as an input a respect set of time series frames for each of the plurality of vocalization instances of a VSP. For example, with continued reference to FIG. 2, as noted above, each respective set of one or more temporal frames, generated by the windowing module 211, provides the initial segmentation of a corresponding one of the plurality of vocalization instances of the VSP. As such, those of ordinary skill in the art will appreciate from the present disclosure that the mapping provided by the frame feature mapping module 236 is based on the frame boundary times $t_1, t_2, \ldots, t_n$ generated by the windowing module 211.

As represented by block 5-2, the method 500 includes selecting a pair of segments (or initially, temporal frames) that are adjacent within each respective set of segments/ frames for each of the plurality of vocalization instances of the VSP. For example, with continued reference to FIG. 2, the adjacent segment selector 241 selects a pair segments that are adjacent within each respective set of the temporal frames of the plurality of vocalization instances of the VSP, at least initially using the mapping provided by the frame feature mapping module 236. As represented by block 5-3, the method 500 includes determining the variance (error) that would result by merging the selected pair of segments within each respective set of the temporal frames for each of the plurality of vocalization instances of the VSP. That is, a respective error value is determined for each of the plurality of vocalization instances of the VSP as a function of merging the selected pair, and a variance value is determined as a function of the respective error values associated with the plurality of vocalization instances of the VSP. For example, with continued reference to FIG. 2, the error evaluation module 243 determining a respective error value for each of the plurality of vocalization instances of the VSP as a function of merging the selected pair, and then determines a variance value as a function of the respective error values.

As represented by block 5-4, the method 500 includes determining whether or not there is at least one more additional pair of adjacent segments to evaluate. For example, with continued reference to FIG. 2, the adjacent segment selector 241 determines whether or not the respective sets of the temporal frames of the plurality of vocalization instances of the VSP include an additional adjacent pair combination that has not yet been evaluated.

If there is an additional adjacent pair combination that has not yet been evaluated ("Yes" path from block 5-4), the method 500 includes circling back to the portion of the method represented by block 5-2 in order to select the yet to be evaluated adjacent pair combination. On the other hand, if all of the adjacent pair combinations that have been evaluated ("No" path from block 5-4), as represented by block 5-5, the method 500 includes selecting the pair combinations that satisfy a merging criteria (e.g., error threshold) across at least the majority of the plurality of vocalization instances of the VSP. For example, with continued reference to FIG. 2, the decision module 245 is configured to selecting the pair combinations that satisfy a merging criteria (e.g., error threshold) across at least the majority of the plurality of vocalization instances of the VSP. As noted above, in some implementations, merging is permitted for an adjacent pair when the merging criteria is satisfied across all of the plurality of vocalization instances of the VSP. As represented by block 5-5a, in some implementations, the merging criteria includes a differential error satisfying an error performance target. In some implementations, the performance target includes a minimum differential error. In some implementations, the performance target includes a differential error satisfying a threshold level.

Subsequently, as represented by block 5-6, the method 500 includes merging the selected pair combinations to produce a preferred concurrent segmentation of the plurality of vocalization instances of the VSP. For example, with continued reference to FIG. 2, the decision module 245 is configured to effectuate the merging of the selected pair combinations across the plurality of vocalization instances of the VSP, and then write the resulting concurrent segmentation of the plurality of vocalization instances of the VSP in the concurrently segmented VSP buffer 135.

Figure 6:
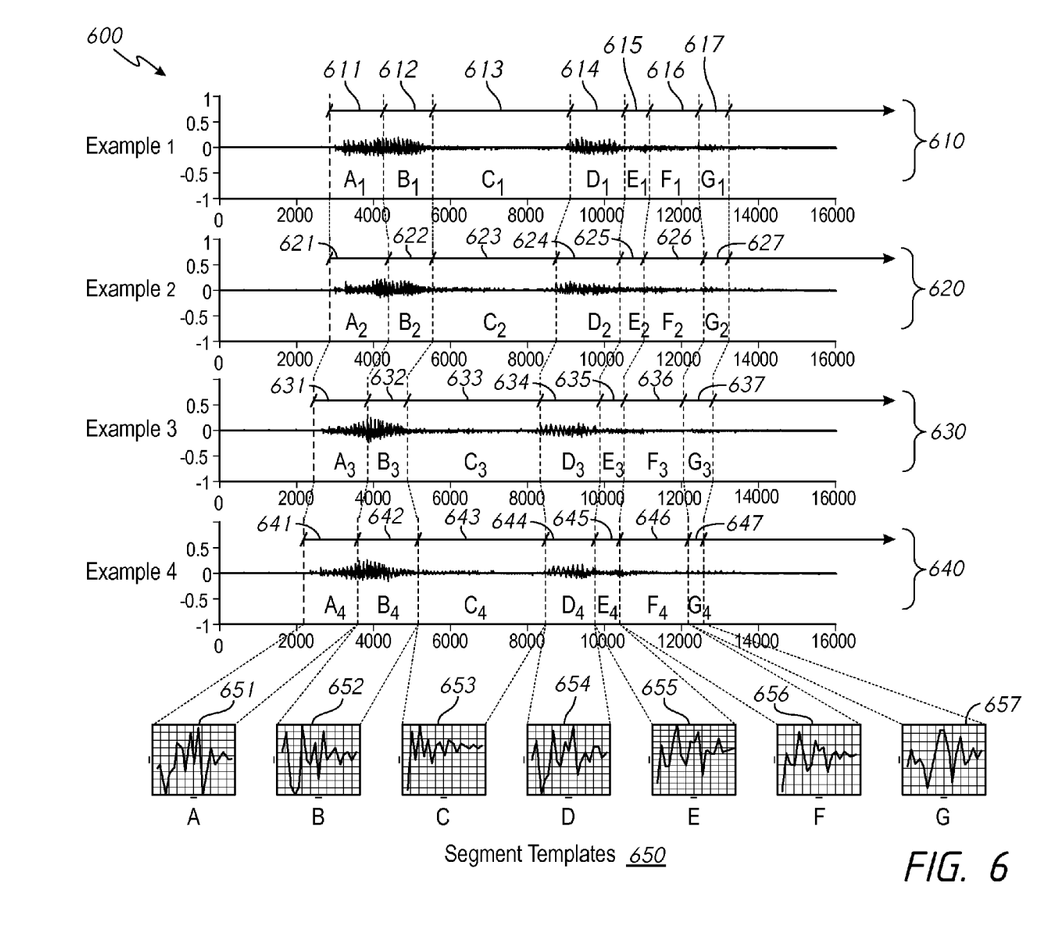
FIG. 6 is a performance diagram illustrating an example of a concurrent segmentation of multiple instances of a VSP in accordance with some implementations.

As an example, FIG. 6 is a performance diagram illustrating an example of a concurrent segmentation 600 of multiple instances of a VSP in accordance with some implementations, such as would be generated by the process described above with reference to FIGS. 2 and 5. The concurrent segmentation 600 includes a plurality of vocalization instances of the VSP that have been jointly segmented.

As shown in the example provided in FIG. 6, the plurality of vocalization instances of the VSP includes four vocalization instances 610, 620, 630, 640. While four vocalization instances are illustrated in FIG. 6, those of ordinary skill in the art will appreciate from the present disclosure that any number of vocalization instances can be utilized in various implementations. In accordance with the process described above with reference to FIGS. 2 and 5, each vocalization instance 610, 620, 630, 640 has been jointly segmented with the others into seven segments ($A_N$ to $G_N$). As such, the first vocalization instance 610 includes seven segments 611, 612, 613, 614, 615, 616, 617 ($A_1$, $B_1$, $C_1$, $D_1$, $E_1$, $F_1$, $G_1$). The second vocalization instance 620 includes seven segments 621, 622, 623, 624, 625, 626, 627 ($A_2$, $B_2$, $C_2$, $D_2$, $E_2$, $F_2$, $G_2$). The third vocalization instance 630 includes seven segments 631, 632, 633, 634, 635, 636, 637 ($A_3$, $B_3$, $C_3$, $D_3$, $E_3$, $F_3$, $G_3$). The fourth vocalization instance 640 includes seven segments 641, 642, 643, 644, 645, 646, 647 ($A_4$, $B_4$, $C_4$, $D_4$, $E_4$, $F_4$, $G_4$). In other words, the vocalization instances of the VSP has been segmented to include the same number of segments ($N_S$) as one another.

In some implementations, having the same number of segments ($N_S$) for each VSP enables the generation and utilization of a common set of segment templates 650 for the VSP, which reduces memory allocation, processor usage, and ultimately power consumption. Segment template A (651) is a function of the corresponding first segments ($A_n$) from each of the vocalization instances 610, 620, 630, 640. Segment template B (652) is a function of the corresponding second segments ($B_n$) from each of the vocalization instances 610, 620, 630, 640. Segment template C (653) is a function of the corresponding third segments ($C_n$) from each of the vocalization instances 610, 620, 630, 640. Segment template D (654) is a function of the corresponding fourth segments ($D_n$) from each of the vocalization instances 610, 620, 630, 640. Segment template E (655) is a function of the corresponding fifth segments ($E_n$) from each of the vocalization instances 610, 620, 630, 640. Segment template F (656) is a function of the corresponding sixth segments ($F_n$) from each of the vocalization instances 610, 620, 630, 640. Segment template G (657) is a function of the corresponding seventh segments ($G_n$) from each of the vocalization instances 610, 620, 630, 640.

Figure 7:
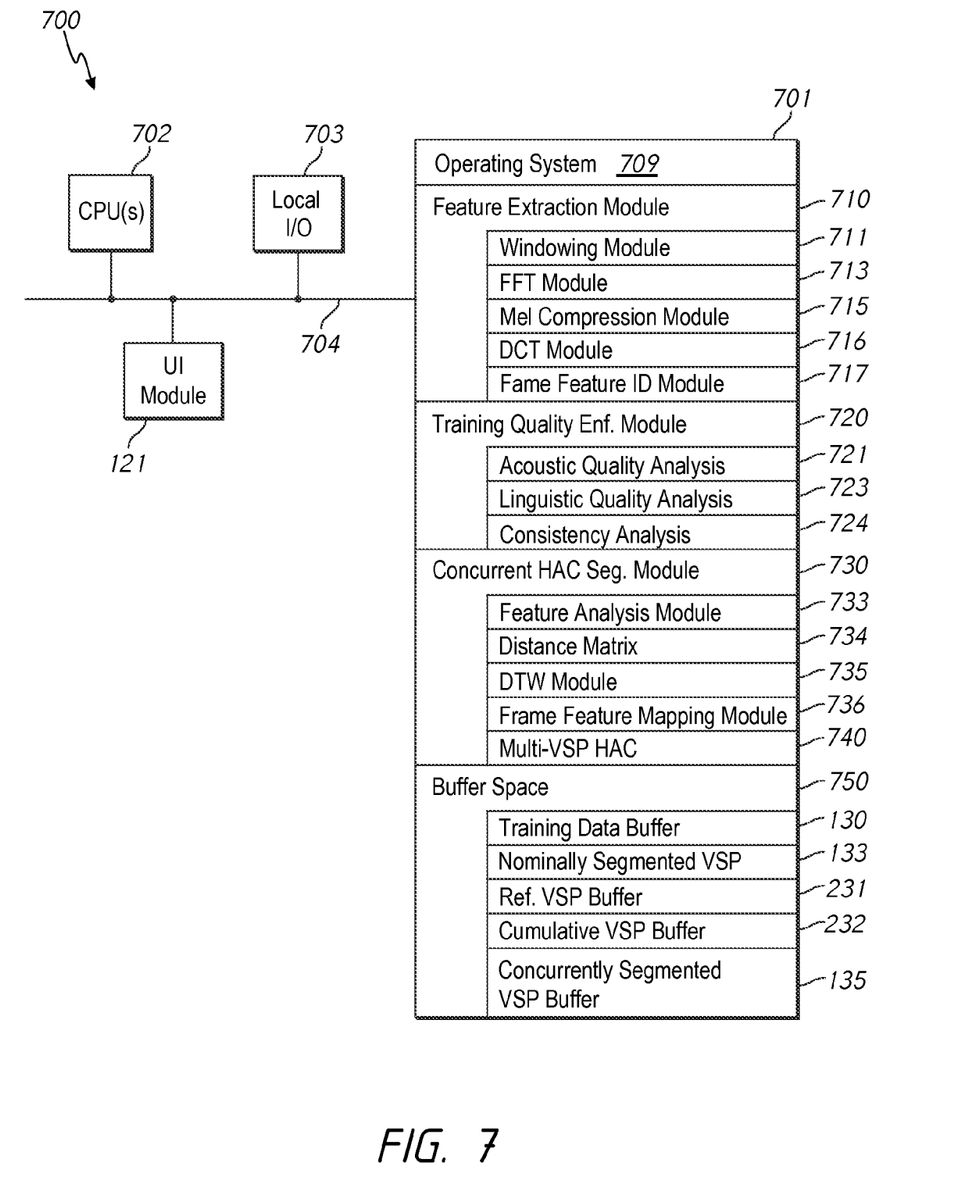
FIG. 7 is a schematic diagram of a VSP detection system configured to detect VSPs as vocalized by a particular speaker in accordance with some implementations.

FIG. 7 is a schematic diagram of a VSP detection system 700 configured to detect VSPs as vocalized by a particular speaker in accordance with some implementations. The VSP detection system 700 illustrated in FIG. 7 is similar to and adapted from the VSP detection system 200 illustrated in FIG. 2. Elements common to each include common reference numbers, and only the differences between FIGS. 2 and 7 are described herein for the sake of brevity. Moreover, while pertinent features are illustrated, those skilled in the art will appreciate from the present disclosure that various other features have not been illustrated for the sake of brevity and so as not to obscure more pertinent aspects of the example implementations disclosed herein.

To that end, as a non-limiting example, in some implementations the VSP detection system 700 includes one or more processing units (CPU's) 702, one or more local I/O (input/output) interfaces 703, the UI module 121, an allocation of programmable logic and/or non-transitory memory (local storage) 701, and one or more communication buses 704 for interconnecting these and various other components not illustrated for the sake of brevity.

In some implementations, the communication buses 704 include circuitry that interconnects and controls communications between components. In various implementations the programmable logic and/or non-transitory memory 701 includes a suitable combination of a programmable gate array (such as an FPGA or the like), high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The programmable logic and/or non-transitory memory 701 optionally includes one or more storage devices remotely located from the CPU(s) 702. The programmable logic and/or non-transitory memory 701 comprises a non-transitory computer readable storage medium. In some implementations, the programmable logic and/or non-transitory memory 701 includes the following programs, modules and data structures, or a subset thereof including an optional operating system 709, a feature extraction module 710, a training quality enforcement module 720, a concurrent HAC segmentation module 730, and a buffer space 750.

The operating system 709 includes procedures for handling various basic system services and for performing hardware dependent tasks. In some implementations, the operating system 709 includes some or all of an operating system executed by the CPU(s) 702.

In some implementations, the feature extraction module 710 includes a windowing module 711, a FFT module 713, a Mel compression module 715, a DCT module 716, and a frame feature identification module 717. In some implementations, the windowing module 711 is configured to mark and separate a set of one or more temporal frames of each of the plurality of vocalization instances of the VSP for frame boundary times $t_1, t_2, \ldots, t_n$. To that end, the windowing module 711 includes computer program instructions and/or logic, and heuristics and metadata. In some implementations, the FFT module 713 is configured to generate a corresponding frequency domain representation for each of the one or more temporal frames in each respective set corresponding to the plurality of vocalization instances of the VSP. To that end, the FFT module 713 includes computer program instructions and/or logic, and heuristics and metadata. In some implementations, the Mel compression module 715 is configured to compress the respective sets of frame-wise frequency domain representations (of the VSP vocalization instances) into a set of Mel frequencies having dB spectra values. To that end, the Mel compression module 715 includes computer program instructions and/or logic, and heuristics and metadata. In some implementations, the DCT module 716 is configured to apply a discrete cosine transform to the compressed dB spectra values in order to produce the cepstral coefficients. To that end, the DCT module 716 includes computer program instructions and/or logic, and heuristics and metadata. In some implementations, the frame feature identification module 717 is configured to select 19 MFCCs per frame for each of the plurality of vocalization instances of the VSP. The selected frame-wise MFCCs are stored in the nominally segmented VSP buffer 133 and indexed by respective vocalization instance identifiers corresponding to the plurality of vocalization instances of the VSP. As noted above, each respective set of one or more temporal frames, generated by the windowing module 211, provides the initial segmentation of a corresponding one of the plurality of vocalization instances of the VSP. To that end, the frame feature identification module 717 includes computer program instructions and/or logic, and heuristics and metadata.

In some implementations, the training quality enforcement module 720 includes an acoustic quality analysis module 721, a linguistic quality analysis module 723, and consistency analysis module 724. In some implementations, the acoustic quality analysis module 721 is configured to determine acoustic acceptability as described above. To that end, the acoustic quality analysis module 721 includes computer program instructions and/or logic, and heuristics and metadata. In some implementations, the linguistic quality analysis module 723 is configured to determine linguistic acceptability as described above. To that end, the linguistic quality analysis module 723 includes computer program instructions and/or logic, and heuristics and metadata. In some implementations, the consistency analysis module 724 is configured to determine whether or not a function of the variation between DTW MFCCs and the MFCCs of the reference VSP vocalization instance breaches a threshold performance metric, as described above. To that end, the consistency analysis module 724 includes computer program instructions and/or logic, and heuristics and metadata.

In some implementations, the concurrent HAC segmentation module 730 includes a feature analysis module 733, a distance matrix 734, a DTW module 735, a frame feature mapping module 736, and a multi-VSP HAC module 740. In some implementations, the feature analysis module 733 is configured to determine respective frame-wise distances between each of the cumulative VSP vocalization instances, stored in the cumulative VSP buffer 232, and the reference VSP vocalization instance, stored in the reference VSP buffer 231. To that end, the feature analysis module 733 includes computer program instructions and/or logic, and heuristics and metadata. The feature analysis module 733 stores resulting distance matrix in the distance matrix buffer 734. In some implementations, the DTW module 735 is configured to perform dynamic time warping on the distance matrix stored in the distance matrix buffer 234. To that end, the DTW module 735 includes computer program instructions and/or logic, and heuristics and metadata. In some implementations, the frame feature mapping module 736 is configured to use the DTW result to map features of the cumulative VSP vocalization instances to features of the VSP vocalization instance in order to produce a segment mapping. To that end, the frame feature mapping module 736 includes computer program instructions and/or logic, and heuristics and metadata. In some implementations, the multi-VSP HAC module 740 is configured to perform the modified HAC process, in accordance with various implementations, in order to adjust the segmentation of the plurality of vocalization instances of the VSP. To that end, the multi-VSP HAC module 740 includes computer program instructions and/or logic, and heuristics and metadata.

In some implementations, the buffer space 750 includes the training data buffer 130, the nominally segmented VSP buffer 133, the reference VSP buffer 231, the cumulative VSP buffer 232, and the concurrently segmented VSP buffer 135.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of concurrently segmenting a plurality of vocalization instances of a voiced sound pattern, the method comprising:
   receiving an audible signal at one or more audio sensors and converting the received audible signal into electronic signal data;
   obtaining a plurality of vocalization instances of a voiced sound pattern (VSP) from the electronic signal data, wherein each of the plurality of vocalization instances of the VSP has one or more vocal characteristics of a particular speaker;
   generating a mapping between each of the plurality of vocalization instances of the VSP by performing a dynamic time warping process on corresponding spectral components of portions of the plurality of vocalization instances of the VSP; and
   concurrently segmenting the plurality of vocalization instances of the VSP using the mapping and in order to satisfy a performance condition using a modified hierarchical agglomerative clustering (HAC) process.

2. The method of claim 1, further comprising extracting a respective set of features for each of the plurality of vocalization instances of the VSP, and wherein generating the mapping between each of the plurality of vocalization instances of the VSP is based on the extracted respective sets of features.

3. The method of 2, wherein extracting a respective set of features for each of the plurality of vocalization instances of the VSP comprises:
   generating a respective set of two or more temporal frames for each of the plurality of vocalization instances of the VSP;
   generating a corresponding set of frequency domain representations for each of the respective sets of one or more temporal frames;
   compressing the corresponding sets of frequency domain representations into respective sets of Mel frequencies having dB spectra values; and
   producing cepstral coefficients from the Mel frequencies.

4. The method of claim 1, further comprising:
   determining acoustic acceptability of each of the plurality of vocalization instances of the VSP using time domain representations of the plurality of vocalization instances of the VSP; and
   obtaining replacements for acoustically unacceptable vocalization instances of the VSP.

5. The method of claim 1, further comprising:
   determining linguistic acceptability of each of the plurality of vocalization instances of the VSP using frequency domain representations of the plurality of vocalization instances of the VSP; and
   obtaining replacements for linguistically unacceptable vocalization instances of the VSP.

6. The method of claim 1, further comprising:
   nominally segmenting each of the plurality of vocalization instances of the VSP in order to produce a nominal segmentation that is independent of the mapping, and
   wherein concurrently segmenting the plurality of vocalization instances of the VSP using the mapping is based at least in part of the nominal segmentation of the plurality of vocalization instances of the VSP.

7. The method of claim 1, wherein generating the mapping between each of the plurality of vocalization instances of the VSP comprises:
   generating a distance matrix by determining respective frame-wise spectral feature distances between a first one of the plurality of vocalization instances of the VSP and each of respective others of the plurality of vocalization instances of the VSP, and
   the dynamic time warping process is applied to the distance matrix.

8. The method of claim 7, wherein generating the mapping between each of the plurality of vocalization instances of the VSP comprises:
   utilizing a result of the dynamic time warping process in order to match frame-wise spectral features between the plurality of vocalization instances of the VSP.

9. The method of claim 7, further comprising:
   determining whether or not a consistency threshold is satisfied based on a result of the dynamic time warping process; and
   rejecting the result of the dynamic time warping process of the dynamic time warping process in response to determining that the consistency threshold is not satisfied.

10. The method of claim 9, wherein the consistency threshold is based on a function of variation between the dynamic time warping mel-frequency cepstrum coefficients (MFCCs) of the first one of the plurality of vocalization instances of the VSP, and the MFCCs of the respective others of the plurality of vocalization instances of the VSP.

11. The method of claim 9, wherein the consistency threshold is based on a function of variation between the dynamic time warping a set of spectral features of the first one of the plurality of vocalization instances of the VSP, and respective sets of spectral features of the respective others of the plurality of vocalization instances of the VSP.

12. The method of claim 1, wherein concurrently segmenting the plurality of vocalization instances of the VSP comprises:
  determining for each of a plurality of adjacent segment pair combinations a respective variance that would result by merging the constituent pair of adjacent segments within each respective set of segments for each of the plurality of vocalization instances of the VSP;
  selecting pair combinations that satisfy a merging criteria across at least the majority of the plurality of vocalization instances of the VSP; and
  merging the selected pair combinations to produce a preferred concurrent segmentation of the plurality of vocalization instances of the VSP.

13. The method of claim 12, wherein the merging criteria includes a differential error satisfying an error performance target.

14. The method of claim 13, wherein the error performance target includes a differential error satisfying a threshold level.

15. The method of claim 12, wherein merging is permitted for an adjacent pair when the merging criteria is satisfied across all of the plurality of vocalization instances of the VSP.

16. A system provided to concurrently segment a plurality of vocalization instances of a voiced sound pattern, the system comprising:
  one or more audio sensors configured to receive an audible signal and convert the received audible signal into electronic signal data;
  a feature extraction module configured to obtain the plurality of vocalization instances of a voiced sound pattern (VSP) from the electronic signal data;
  a mapping module configured to generate a mapping between each of the plurality of vocalization instances of a VSP by performing a dynamic time warping process on corresponding spectral components of portions of the plurality of vocalization instances of the VSP, and wherein each of the plurality of vocalization instances of the VSP has one or more vocal characteristics of a particular speaker; and
  a multi-VSP hierarchical agglomerative clustering (HAC) module configured to concurrently segment the plurality of vocalization instances of the VSP using the mapping and in order to satisfy a performance condition using a modified HAC process.

17. The system of claim 16, wherein the feature extraction module is further configured to extract a respective set of features for each of the plurality of vocalization instances of the VSP, and wherein generating the mapping between each of the plurality of vocalization instances of the VSP is based on the extracted respective sets of features.

18. The system of claim 16, the mapping module comprises:
  a feature analysis module configured to generate a distance matrix by determining respective frame-wise spectral feature distances between a first one of the plurality of vocalization instances of the VSP and each of respective others of the plurality of vocalization instances of the VSP, and
  a dynamic time warping module configured to apply a dynamic time warping process to the distance matrix.

19. The system of claim 18, further comprising a frame feature mapping module configured to utilize a result of the dynamic time warping process in order to match frame-wise spectral features between the plurality of vocalization instances of the VSP.

20. The system of claim 16, wherein the multi-VSP HAC module is configured to concurrently segment the plurality of vocalization instances of the VSP by:
  determining for each of a plurality of adjacent segment pair combinations a respective variance that would result by merging the constituent pair of adjacent segments within each respective set of segments for each of the plurality of vocalization instances of the VSP;
  selecting pair combinations that satisfy a merging criteria across at least the majority of the plurality of vocalization instances of the VSP; and
  merging the selected pair combinations to produce a preferred concurrent segmentation of the plurality of vocalization instances of the VSP.

* * * * *